US012709252B2

(12) United States Patent
Golov

(10) Patent No.: US 12,709,252 B2
(45) **Date of Patent: *Aug. 18, 2026**

(54) DETECTING ROAD CONDITIONS BASED ON BRAKING EVENT DATA RECEIVED FROM VEHICLES

(71) Applicant: Lodestar Licensing Group LLC, Burlingame, CA (US)

(72) Inventor: Gil Golov, Backnang (DE)

( * ) Notice: Subject to any disclaimer, the term of this patent is extended or adjusted under 35 U.S.C. 154(b) by 257 days.

This patent is subject to a terminal disclaimer.

(21) Appl. No.: 18/481,189

(22) Filed: Oct. 4, 2023

(65) Prior Publication Data

US 2024/0025380 A1 Jan. 25, 2024

Related U.S. Application Data

(63) Continuation of application No. 17/493,742, filed on Oct. 4, 2021, now Pat. No. 11,866,020, which is a (Continued)

(51) Int. Cl.

| | |
|---|---|
| ***G06N 3/08*** | (2023.01) |
| ***B60T 7/22*** | (2006.01) |
| ***B60W 50/00*** | (2006.01) |
| ***G05D 1/00*** | (2006.01) |
| ***G05D 1/243*** | (2024.01) |
| ***G06N 3/04*** | (2023.01) |
| ***G06V 10/764*** | (2022.01) |

(Continued)

(52) U.S. Cl.

CPC ........... *B60T 7/22* (2013.01); *B60W 50/0098* (2013.01); *G05D 1/0276* (2013.01); *G05D 1/243* (2024.01); *G06N 3/08* (2013.01); *G06V 10/764* (2022.01); *G06V 10/82* (2022.01); *G06V 20/56* (2022.01); *G06V 20/58* (2022.01); *B60K 23/00* (2013.01); *B60T 7/12* (2013.01); *B60T 8/17* (2013.01); *B60W 2050/0075* (2013.01); *B60W 2556/10* (2020.02); *B60W 2556/65* (2020.02); *B62D 6/001* (2013.01); *G06N 3/04* (2013.01)

(58) Field of Classification Search

CPC ...... G07C 5/008; H04W 4/40; H04W 64/003; H04W 64/006; G08G 1/0967; G08G 1/0967; G08G 1/09679

See application file for complete search history.

(56) References Cited

U.S. PATENT DOCUMENTS

| | | | |
|---|---|---|---|
| 6,023,653 | A | 2/2000 | Ichimura et al. |
| 8,185,296 | B2 | 5/2012 | Yokoyama et al. |

(Continued)

FOREIGN PATENT DOCUMENTS

| | | |
|---|---|---|
| WO | 2018015811 | 1/2018 |

OTHER PUBLICATIONS

International Search Report and Written Opinion, PCT/US2019/025112, mailed Jul. 19, 2019.

(Continued)

*Primary Examiner* — Anshul Sood

(57) ABSTRACT

Data is received regarding vehicle braking events, each event occurring on one of a plurality of vehicles, and each event associated with a location. A determination is made that the braking events correspond to a pattern. Based on determining that the braking events correspond to the pattern, a first location is identified. In response to identifying the first location, at least one action is performed.

20 Claims, 8 Drawing Sheets

Related U.S. Application Data continuation of application No. 16/010,060, filed on Jun. 15, 2018, now Pat. No. 11,161,518.

(51) Int. Cl.

| | |
|---|---|
| ***G06V 10/82*** | (2022.01) |
| ***G06V 20/56*** | (2022.01) |
| ***G06V 20/58*** | (2022.01) |
| *B60K 23/00* | (2006.01) |
| *B60T 7/12* | (2006.01) |
| *B60T 8/17* | (2006.01) |
| *B62D 6/00* | (2006.01) |

(56) References Cited

U.S. PATENT DOCUMENTS 8,442,791 B2 5/2013 Stahlin
8,457,827 B1 6/2013 Ferguson et al.
8,543,320 B2 9/2013 Zheng et al.
8,688,369 B2 4/2014 Denaro
8,825,371 B2 9/2014 Prokhorov et al.
9,043,127 B2 5/2015 Denaro
9,062,977 B2 6/2015 Prokhorov et al.
9,104,535 B1 8/2015 Brinkmann et al.
9,185,526 B2 11/2015 Guba et al.
9,221,461 B2 12/2015 Ferguson et al.
9,279,688 B2 3/2016 Denaro
9,296,299 B2 3/2016 Ricci
9,311,271 B2 4/2016 Wright
9,754,501 B2 9/2017 Stenneth
9,786,172 B2 10/2017 Takahara et al.
9,797,735 B2 10/2017 Denaro
9,805,601 B1 10/2017 Fields et al.
9,961,551 B2 5/2018 Scholl et al.
10,031,523 B2 7/2018 Ricci et al.
10,046,328 B2 8/2018 Nakayama et al.
10,049,328 B2 8/2018 Jiang et al.
10,068,477 B2 9/2018 Miller et al.
10,099,697 B2 10/2018 Tatourian et al.
10,139,831 B2 11/2018 Yan
10,163,274 B1 12/2018 Brinkmann et al.
10,179,586 B2 1/2019 Johnson
10,215,571 B2 2/2019 Ghadiok et al.
10,223,380 B2 3/2019 Giurgiu et al.
10,257,270 B2 4/2019 Cohn et al.
10,269,242 B2 4/2019 Ahmad et al.
10,298,741 B2 5/2019 Goren et al.
10,311,728 B2 6/2019 Stenneth et al.
10,331,141 B2 6/2019 Grimm et al.
10,345,110 B2 7/2019 Westover et al.
10,449,967 B1 10/2019 Ferguson
10,460,394 B2 10/2019 Perl et al.
10,493,994 B1 12/2019 Fields
10,518,720 B2 12/2019 Haque
10,529,231 B2 1/2020 Scofield
10,540,892 B1 1/2020 Fields et al.
10,543,853 B2 1/2020 Toyoda et al.
10,642,278 B2 5/2020 Matsui et al.
10,648,818 B2 5/2020 Denaro
10,755,111 B2 8/2020 Golov et al.
10,777,024 B1 9/2020 Brinkmann et al.
10,807,592 B2 10/2020 Golov
10,894,545 B2 1/2021 Bielby
10,997,429 B2 5/2021 Golov
11,004,339 B2 5/2021 Oe et al.
11,009,876 B2 5/2021 Bielby
11,072,343 B2 7/2021 Emura et al.
11,117,593 B2 9/2021 Kondo et al.
11,161,518 B2 11/2021 Golov
11,163,309 B2 11/2021 Tay et al.
11,299,149 B2 4/2022 Yan
11,393,215 B2 7/2022 Sawada et al.
11,441,916 B1 9/2022 Konrardy et al.
11,693,408 B2 7/2023 Bielby
11,727,794 B2 8/2023 Bielby
11,836,985 B2 12/2023 Golov et al.
11,861,913 B2 1/2024 Golov
11,866,020 B2 1/2024 Golov
12,020,488 B2 6/2024 Golov
12,246,727 B1 3/2025 Brinkmann et al.
2005/0232469 A1 10/2005 Schofield et al.
2007/0244631 A1 10/2007 Jung et al.
2008/0189040 A1 8/2008 Nasu et al.
2009/0228204 A1 9/2009 Zavoli et al.
2009/0234552 A1 9/2009 Takeda et al.
2009/0265070 A1 10/2009 Okada et al.
2010/0099353 A1 4/2010 Komori
2011/0153532 A1 6/2011 Kuge et al.
2011/0302214 A1 12/2011 Frye et al.
2012/0109517 A1 5/2012 Watanabe
2012/0296560 A1 11/2012 Zheng et al.
2013/0054049 A1 2/2013 Uno
2014/0067187 A1 3/2014 Ferguson et al.
2014/0172290 A1 6/2014 Prokhorov et al.
2014/0195214 A1 7/2014 Kozloski et al.
2014/0324336 A1 10/2014 Prokhorov et al.
2014/0358414 A1 12/2014 Ibrahim et al.
2015/0039365 A1 2/2015 Haque
2015/0057838 A1 2/2015 Scholl et al.
2015/0112512 A1 4/2015 Fan et al.
2015/0178578 A1 6/2015 Hampiholi
2015/0191178 A1 7/2015 Roy et al.
2016/0150070 A1 5/2016 Goren et al.
2016/0171521 A1 6/2016 Ramirez et al.
2016/0176440 A1 6/2016 Witte et al.
2016/0209841 A1 7/2016 Yamaoka et al.
2016/0229404 A1 8/2016 Byun
2016/0251081 A1 9/2016 Staskevich et al.
2016/0280224 A1 9/2016 Tatourian et al.
2016/0351050 A1 12/2016 Takahara et al.
2016/0358477 A1 12/2016 Ansari
2016/0363935 A1 12/2016 Shuster et al.
2017/0015318 A1 1/2017 Scofield et al.
2017/0032673 A1 2/2017 Scofield et al.
2017/0039890 A1 2/2017 Truong et al.
2017/0108870 A1 4/2017 Miller et al.
2017/0124476 A1 5/2017 Levinson et al.
2017/0217433 A1 8/2017 Halder et al.
2017/0232974 A1 8/2017 Nishida
2017/0277716 A1 9/2017 Giurgiu et al.
2017/0301220 A1 10/2017 Jarrell et al.
2017/0310747 A1 10/2017 Cohn et al.
2017/0316691 A1 11/2017 Miller et al.
2017/0323179 A1 11/2017 Vallespi-gonzalez
2017/0351266 A1 12/2017 Nickolaou
2017/0372431 A1 12/2017 Perl et al.
2018/0004223 A1 1/2018 Baldwin
2018/0018869 A1 1/2018 Ahmad et al.
2018/0038698 A1 2/2018 Denaro
2018/0045519 A1 2/2018 Ghadiok et al.
2018/0047285 A1 2/2018 Johnson
2018/0050800 A1 2/2018 Boykin et al.
2018/0075309 A1 3/2018 Sathyanarayana et al.
2018/0093676 A1 4/2018 Emura et al.
2018/0105186 A1 4/2018 Motomura et al.
2018/0107942 A1 4/2018 Jiang et al.
2018/0204459 A1 7/2018 Bradley et al.
2018/0238702 A1 8/2018 Liebinger et al.
2018/0257643 A1* 9/2018 Kroop ............. B60W 60/00253
2018/0259968 A1 9/2018 Frazzoli et al.
2018/0293466 A1 10/2018 Viswanathan
2018/0335785 A1 11/2018 Miller et al.
2018/0349802 A1 12/2018 Jiang et al.
2019/0009794 A1 1/2019 Toyoda et al.
2019/0047584 A1 2/2019 Donnelly
2019/0049257 A1 2/2019 Westover et al.
2019/0049262 A1 2/2019 Grimm et al.
2019/0051172 A1 2/2019 Stenneth et al.
2019/0064843 A1 2/2019 Matsui et al.
2019/0077413 A1 3/2019 Kondo et al.
2019/0088132 A1 3/2019 Riggins et al.
2019/0102840 A1 4/2019 Perl et al.
2019/0108752 A1 4/2019 Oe et al.
2019/0147252 A1 5/2019 Sawada et al.

(56) References Cited

U.S. PATENT DOCUMENTS

2019/0164018 A1* 5/2019 Zhu ...................... G06F 18/251
2019/0168772 A1 6/2019 Emura et al.
2019/0170519 A1 6/2019 Anwar et al.
2019/0196481 A1 6/2019 Tay et al.
2019/0205765 A1 7/2019 Mondello et al.
2019/0236379 A1 8/2019 Golov et al.
2019/0286133 A1 9/2019 Bielby
2019/0287392 A1 9/2019 Bielby
2019/0300017 A1 10/2019 Glaser et al.
2019/0316913 A1 10/2019 Golov
2019/0382004 A1 12/2019 Golov
2019/0382029 A1 12/2019 Golov
2019/0391576 A1 12/2019 Zhang et al.
2020/0018604 A1 1/2020 Zhang et al.
2020/0018605 A1 1/2020 Kusano
2020/0023839 A1 1/2020 Yan
2020/0039508 A1 2/2020 Onishi
2020/0135021 A1 4/2020 Akachi
2020/0135032 A1 4/2020 Switkes et al.
2020/0172112 A1 6/2020 Kawashima
2020/0202560 A1 6/2020 Viswanathan
2020/0217667 A1 7/2020 Kim et al.
2020/0226794 A1 7/2020 Sugio et al.
2020/0263996 A1 8/2020 Gokhale et al.
2020/0342241 A1 10/2020 Tiziani
2020/0356108 A1 11/2020 Toma et al.
2020/0361480 A1 11/2020 Rodriguez Bravo et al.
2020/0387722 A1 12/2020 Golov et al.
2021/0004622 A1 1/2021 We
2021/0053580 A1 2/2021 Horiguchi et al.
2021/0070286 A1 3/2021 Green et al.
2021/0216790 A1 7/2021 Golov
2021/0221385 A1 7/2021 Jiang
2021/0229674 A1 7/2021 Anikin et al.
2021/0245775 A1 8/2021 Subramanian et al.
2021/0271243 A1 9/2021 Bielby
2021/0323565 A1 10/2021 Miyagawa
2022/0024469 A1 1/2022 Golov
2022/0169280 A1 6/2022 Brown et al.
2022/0176989 A1 6/2022 Hwang et al.
2022/0194391 A1 6/2022 Ferguson
2022/0234621 A1 7/2022 Fasola et al.
2022/0242448 A1 8/2022 Chen et al.
2022/0381564 A1 12/2022 Kitchen et al.
2023/0041045 A1 2/2023 Golov
2023/0045250 A1 2/2023 Golov
2023/0341855 A1 10/2023 Bielby
2023/0358568 A1 11/2023 Schuerman et al.
2023/0368587 A1 11/2023 Brandmaier et al.
2023/0394961 A1 12/2023 Bielby
2024/0005667 A1 1/2024 Golov
2024/0046653 A1 2/2024 Golov et al.
2024/0051528 A1 2/2024 Tamura
2025/0201128 A1 6/2025 Katkoori et al.

OTHER PUBLICATIONS

Zhang, Xiaoyu, "The research of traffic information collection system based on crowdsourcing and related privacy issues", master's thesis, May 28, 2016, Jilin University, Changchun, China.

* cited by examiner

DETECTING ROAD CONDITIONS BASED ON BRAKING EVENT DATA RECEIVED FROM VEHICLES

RELATED APPLICATIONS

The present application is a continuation application of U.S. patent application Ser. No. 17/493,742 filed Oct. 4, 2021, which is a continuation application of U.S. patent application Ser. No. 16/010,060 filed Jun. 15, 2018, issued as U.S. Pat. No. 11,161,518 on Nov. 2, 2021, the entire disclosures of which applications are hereby incorporated herein by reference.

This application is related to U.S. Pat. No. 10,997,429 issued on May 4, 2021, entitled "Determining Autonomous Vehicle Status Based on Mapping of Crowdsourced Object Data," by Gil Golov, the entire contents of which application is incorporated by reference as if fully set forth herein.

This application is also related to U.S Pat No. 10,894,545 issued on Jan. 19, 2021, entitled "Configuration of a Vehicle Based on Collected User Data," by Robert Richard Noel Bielby, the entire contents of which application is incorporated by reference as if fully set forth herein.

FIELD OF THE TECHNOLOGY

At least some embodiments disclosed herein relate to monitoring operating events for vehicles in general, and more particularly, but not limited to, monitoring data regarding braking events occurring on vehicles.

BACKGROUND

A user of a vehicle can be a driver in the case of a manually-driven vehicle. In other cases, such as for an autonomous vehicle, the user of the vehicle typically performs fewer control actions than a "driver" as regards the operation of the vehicle. For example, in some cases, the user may simply select a destination to which the vehicle travels, but without performing any directional or other control of the immediate movement of the vehicle on the roadway.

Recent developments in the technological area of autonomous driving allow a computing system to operate, at least under some conditions, control elements of a vehicle without the assistance from a user of the vehicle. For example, sensors (e.g., cameras and radars) can be installed on a vehicle to detect the conditions of the surroundings of the vehicle on a roadway. One function of these sensors is to detect objects that are encountered during travel of the vehicle.

Autonomous vehicles use a variety of sensors and artificial intelligence algorithms to detect these objects and to analyze the changing environment around the vehicle during travel. Objects that are encountered may include, for example, traffic lights, road signs, road lanes, etc. Failing to detect certain of these objects could cause an unexpected or undesired behavior of the vehicle, and in some cases could expose passengers of the vehicle and/or others outside of the vehicle (e.g., in the immediate area surrounding the vehicle) to danger.

In some cases, an object may be positioned in a way that creates an unsafe driving condition (e.g., a deep pothole in the center of a road). Failure by a driver or an autonomous vehicle navigation system to detect the unsafe condition may create a physical danger of injury to the driver and/or other passengers of a vehicle (e.g., a vehicle that suddenly encounters a deep pothole or other unsafe road condition without warning).

During normal operation of a vehicle, the various sensors are used to operate the vehicle. For example, a computing system installed on the vehicle analyzes the sensor inputs to identify the conditions and generate control signals or commands for the autonomous adjustments of the direction and/or speed of the vehicle, without any input from a human operator of the vehicle. Autonomous driving and/or advanced driver assistance system (ADAS) typically involves an artificial neural network (ANN) for the identification of events and/or objects that are captured in sensor inputs.

In general, an artificial neural network (ANN) uses a network of neurons to process inputs to the network and to generate outputs from the network. Each neuron m in the network receives a set of inputs $p_k$, where k=1, 2, . . . , n. In general, some of the inputs to a neuron may be the outputs of certain neurons in the network; and some of the inputs to a neuron may be the inputs to the network as a whole. The input/output relations among the neurons in the network represent the neuron connectivity in the network.

Each neuron m has a bias $b_m$, an activation function $f_m$, and a set of synaptic weights $w_{mk}$ for its inputs $p_k$ respectively, where k=1, 2, . . . , n. The activation function may be in the form of a step function, a linear function, a log-sigmoid function, etc. Different neurons in the network may have different activation functions.

Each neuron m generates a weighted sum $s_m$ of its inputs and its bias, where $s_m=b_m+w_{m1}\times p_1+w_{m2}\times p_2+ \ldots +w_{mn}\times p_n$. The output $a_m$ of the neuron m is the activation function of the weighted sum, where $a_m=f_m(s_m)$.

The relations between the input(s) and the output(s) of an ANN in general are defined by an ANN model that includes the data representing the connectivity of the neurons in the network, as well as the bias $b_m$, activation function $f_m$, and synaptic weights $w_{mk}$ of each neuron m. Using a given ANN model, a computing device computes the output(s) of the network from a given set of inputs to the network.

For example, the inputs to an ANN network may be generated based on camera inputs; and the outputs from the ANN network may be the identification of an item, such as an event or an object.

For example, U.S. Pat. App. Pub. No. 2017/0293808, entitled "Vision-Based Rain Detection using Deep Learning", discloses a method of using a camera installed on a vehicle to determine, via an ANN model, whether the vehicle is in rain or no rain weather.

For example, U.S. Pat. App. Pub. No. 2017/0242436, entitled "Road Construction Detection Systems and Methods", discloses a method of detecting road construction using an ANN model.

For example, U.S. Pat. Nos. 9,672,734 and 9,245,188 discuss techniques for lane detection for human drivers and/or autonomous vehicle driving systems.

In general, an ANN may be trained using a supervised method where the synaptic weights are adjusted to minimize or reduce the error between known outputs resulted from respective inputs and computed outputs generated from applying the inputs to the ANN. Examples of supervised learning/training methods include reinforcement learning, and learning with error correction.

Alternatively or in combination, an ANN may be trained using an unsupervised method where the exact outputs resulted from a given set of inputs is not known a priori before the completion of the training. The ANN can be trained to classify an item into a plurality of categories, or data points into clusters.

Multiple training algorithms are typically employed for a sophisticated machine learning/training paradigm.

The disclosures of the above discussed patent documents are hereby incorporated herein by reference.

BRIEF DESCRIPTION OF THE DRAWINGS

The embodiments are illustrated by way of example and not limitation in the figures of the accompanying drawings in which like references indicate similar elements.

DETAILED DESCRIPTION

Figure 1:
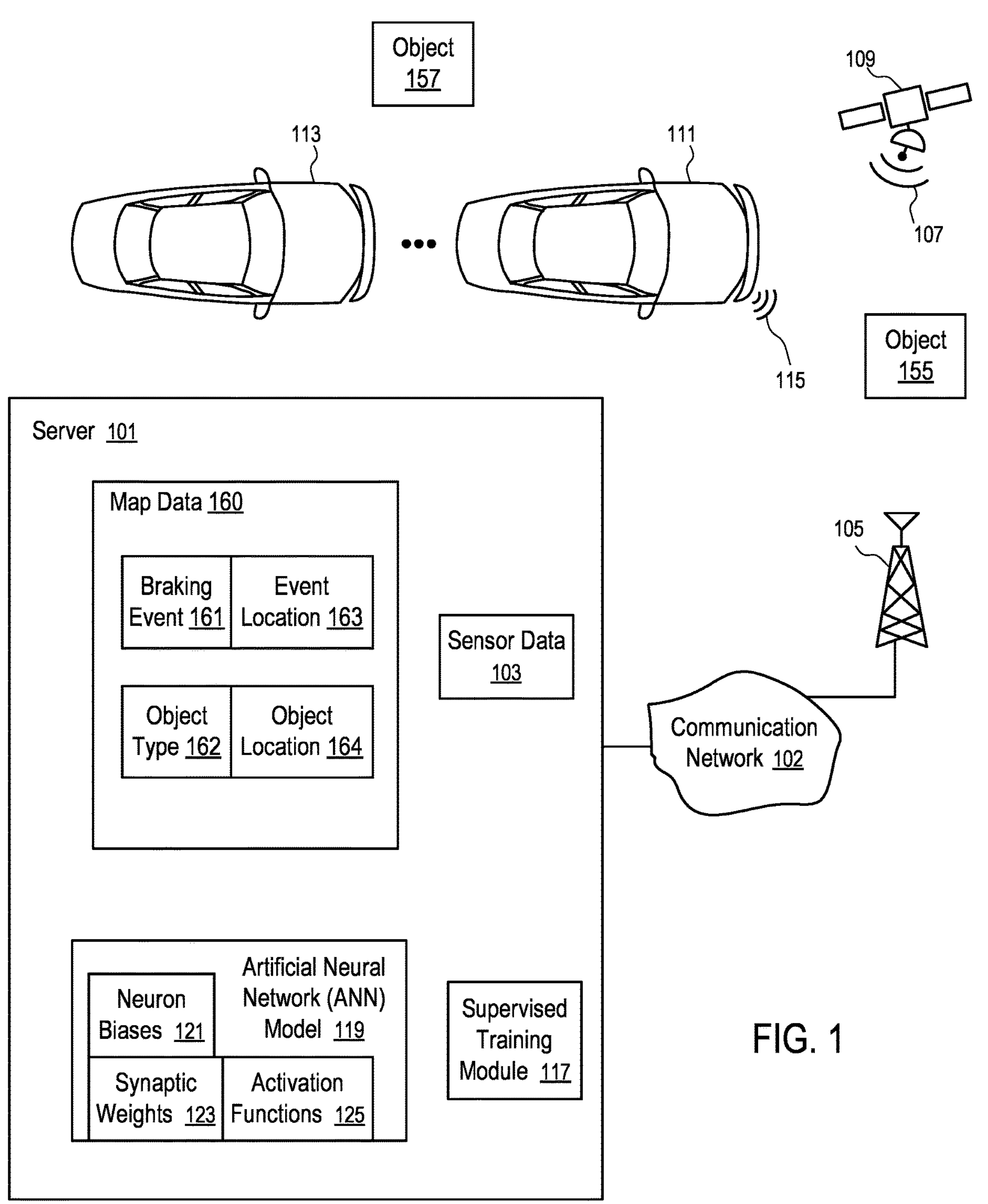
FIG. 1 illustrates a system to receive data regarding braking events occurring on a plurality of vehicles, according to one embodiment.

Currently, the technology supporting autonomous and other vehicles continues to improve. Improvements in digital camera technology, light detection and ranging (LIDAR), and other technologies have enabled vehicles to navigate roadways independent of drivers or with limited assistance from drivers. In some environments, such as factories, autonomous vehicles operate without any human intervention whatsoever.

While autonomous technology is primarily focused on controlling the movement of vehicles in a traditional sense, little emphasis has been placed on alternative applications that may be implemented on top of these autonomous systems. Indeed, application-level systems generally tend to reinforce existing uses of autonomous systems. For example, experimental uses of autonomous technology have been utilized to perform functions such as returning vehicles to a known location after delivering a passenger or performing refueling of vehicles while not utilized by passengers.

However, these approaches fail to fully utilize the hardware and processing power being implemented in autonomous vehicles, or in other vehicles utilizing automated driver assistance systems. Thus, there currently exists a need in the state of the art of autonomous and other vehicles to provide additional services leveraging the existing hardware installed within such vehicles.

In particular, there is a need to solve the technical problem of detecting unsafe road conditions that may be encountered by an autonomous or other vehicle during its operation. In particular, this technical problem includes the need to determine whether navigation and/or other control of the vehicle should be performed to avoid the unsafe condition. In many cases, this detection of unsafe road conditions needs to be determined in real-time.

At least some embodiments disclosed herein relate to monitoring data regarding braking events occurring on vehicles. The data is received from each of the vehicles (e.g., received by a server). Analysis of the braking event data is used to identify unsafe locations, and in response to perform control actions for a vehicle currently being operated (e.g., controlling navigation of a current vehicle based on analysis of the braking event data). These embodiments provide a technological solution to the above technical problem by analyzing data regarding braking events received from other vehicles to identify the unsafe location and cause a control response for a current vehicle. Based on this analysis, an unsafe location on a road (e.g., corresponding to an unsafe road condition) is identified and/or determined. In response, a currently-operating vehicle (sometimes referred to herein as simply "current" vehicle) is, for example, alerted and/or controlled in order to avoid the unsafe road condition. The current vehicle is, for example, a manually-driven vehicle or an autonomous vehicle (e.g., a car, truck, aircraft, drone, watercraft, etc.). In one example, an unsafe road condition may include alien objects that are unsafely positioned on a road. For example, a tree may have unexpectedly fallen on a road due to a recent storm, and the tree is blocking safe travel on the road.

In one embodiment, a cloud service (sometimes referred to as simply the cloud) is used to detect unsafe driving road conditions. For example, when a driver performs an emergency braking, or the automatic emergency braking system of a vehicle is activated, the location of that braking event is transmitted to, for example, a server or other computing device in the cloud service. The location itself may be determined, for example, based on location data (e.g., geographic coordinates) provided from the vehicle itself (e.g., by a GPS location system) and/or location data otherwise associated with or known about the vehicle. The cloud searches for a pattern of emergency braking at the same location (within a tolerance such as, for example, a predetermined distance), which have been reported by numerous vehicles (e.g., other vehicles traveling the same road prior to the current vehicle). This pattern may be used to make a determination that driving is unsafe in that particular location.

In one embodiment, braking event data received from vehicles is analyzed to determine that the braking events correspond to a pattern. For example, pattern recognition can be used on the received data. In one case, machine learning is used to recognize patterns or regularities in data. In some cases, a pattern recognition system can be trained from labeled training data (e.g., supervised learning). In other cases, when no labeled data is available, other algorithms can be used to identify previously unknown patterns (e.g., unsupervised learning).

In one embodiment, a braking event is identified based on a measurement of a brake pedal in a vehicle. For example, a braking event may be identified based on a foot pressure or extent of movement as compared to a predetermined threshold. In another embodiment, a braking event is identified based on a rate of deceleration of the vehicle. For example, if a rate of deceleration exceeds a predetermined threshold, then a braking event is identified. In another example, the rate of deceleration is observed over a predetermined time period (e.g., the rate is averaged over the time period).

In one embodiment, braking event data is analyzed to identify a pattern in which two or more locations of vehicles experiencing a braking event fall within a predetermined distance of another location (e.g., associated with collected or received data), or a predetermined region (e.g., a circular or other area of a predetermined radius or other dimension that encloses locations of braking events).

In one embodiment, identifying an unsafe location requires that a number of braking events within a time period exceed a predetermined number or threshold. For example, the identification can require that three or more braking events occur in a given day.

In one embodiment, in response to identifying an unsafe location, at least one action is performed. For example, a communication can be sent to a current vehicle that identifies the location. In another example, the location can be transmitted to another computing device that is used to control traffic flows, vehicle navigation, etc. In another example, this information can be used, for example, to improve road conditions, traffic sign and traffic lights infrastructure around the unsafe location (e.g., this may improve driving safety).

In another embodiment, braking event data is received by a server (e.g., a server of a cloud service) and stored as a map of locations of the braking events. Data for each braking event is, for example, received from other vehicles that have previously experienced a braking event (e.g., the hardware of these other vehicles is used to collect sensor and other data regarding the braking event that occurred during travel). For example, these other vehicles can be vehicles that have previously traveled over the same road that a current vehicle is presently traveling on. By storing data regarding the braking events (e.g., storing in a map), the current vehicle can be controlled during operation so as to avoid any unsafe locations that are determined from the braking event data.

In one embodiment, additional data from other vehicles can be received and/or stored that relates to objects detected by the other vehicles. For example, a fallen tree may be detected within a predetermined time of the occurrence of a braking event. For example, the map above can store data regarding the stop sign detected by one or more prior vehicles. The map includes a location of the stop sign along with data regarding an associated braking event.

Data received from a current vehicle traveling at or near this same location is compared to data stored in the map. In one example, based on comparing the data received from the current vehicle to the stored map data, navigation or another operating status of the current vehicle is controlled or changed (e.g., an updated configuration is performed). For example, it may be determined that the current vehicle should begin braking at least a predetermined distance or time prior to reaching a location that has been identified as unsafe.

In one embodiment, a cloud service receives braking event data from numerous vehicles. The braking event data is used to create a map of unsafe locations. These unsafe locations are identified based on analysis of the braking event data. The map data can be provided, for example, as an online service to other computing devices associated with vehicle operation. For example, the map data can be used by a server that controls operation of one or more autonomous vehicles. In another example, the service can transmit data to one or more vehicles that is used to control at least one action performed by the vehicle.

As mentioned above, in addition to braking event data, vehicles may send other data. For example, data regarding physical objects detected by vehicles can be sent to a server in a cloud. A map is stored that includes locations for each of these detected objects (e.g., along with braking event data). For example, the map can include data collected by the prior vehicles. For example, locations of physical objects can be based on data received from the prior vehicles.

In one embodiment, objects detected by prior vehicles (e.g., passive objects, such as traffic signs, traffic lights, etc.) are transmitted to the cloud service. The cloud service creates a dynamic map containing the type of object detected and its location (e.g., the map stores data that a stop sign is located at a position x, y). The cloud service stores the map (e.g. in a database or other data repository). Braking event data is also stored in the map (e.g., braking event locations associated with objects within a predetermined distance of the braking event location).

In one embodiment, in response identifying an unsafe location (e.g., as determined based on pattern recognition using braking event data), a server can perform one or more actions. For example, the server can send a communication to the current vehicle. In one case, the communication can cause the current vehicle to take corrective actions, such as terminating an autonomous navigation mode, braking, or changing course.

In one embodiment, in response to receiving a communication from a server, a current vehicle can switch off its autonomous driving mode, use a backup system, and/or activate a braking system to stop the vehicle.

In another embodiment, the cloud service can send a communication to a server or other computing device that monitors an operating status for other vehicles (e.g., a central monitoring service). For example, the cloud service can send a communication to a server operated by governmental authorities. The communication can, for example, identify that a road has an unsafe condition (e.g., at an identified location). In some cases, in response to a determination that the current vehicle has been in an accident associated with an identified unsafe location, the communication can be sent to the server or other computing device. In such a case, one or more indications provided to the server or other computing device can include data obtained from the current or another vehicle associated with a braking event at the accident location (e.g., data stored by the vehicle regarding operating functions and/or state of the vehicle prior to the accident, such as within a predetermined time period prior to the accident).

In one embodiment, the determination whether a vehicle has experienced a braking event and/or been involved in an accident can be based on data from one or more sensors of the vehicle. For example, data from an accelerometer of the vehicle can indicate a rapid deceleration of the vehicle (e.g., deceleration exceeding a threshold). In another case, data can indicate that an emergency system of the vehicle has been activated, such as for example, an airbag, an emergency braking system, etc. In some embodiments, any one and/or a combination of the foregoing events can be deemed to be a braking event for which location data is transmitted to a server.

In one embodiment, a route (e.g., data for the current location of the vehicle) taken by a vehicle being monitored is sent periodically to a cloud service. One or more sensors on the current vehicle are used to obtain data regarding braking events and/or objects in the environment of the vehicle as it travels along the route. Data from the sensors and/or data generated based on analysis of sensor data and/or other data can be, for example, transmitted to the cloud service wirelessly (e.g., using a 3G, 4G, or 5G network or other radio-based communication system).

In one embodiment, in response to identifying an unsafe road location determined based on braking event data, one or more actions of a vehicle are configured. For example, an over-the-air firmware update can be sent to the vehicle for updating firmware of a computing device of the vehicle (e.g., this update causes the vehicle to avoid identified unsafe locations and/or objects at such locations). In one example, the firmware updates a navigation system of the vehicle. The updated configuration is based at least in part on analysis of data that is collected from other vehicles.

In various other embodiments, the configuration of one or more actions performed by a vehicle in response to identifying a location may include, for example, actions related to operation of the vehicle itself and/or operation of other system components mounted in the vehicle and/or otherwise attached to the vehicle. For example, the actions may include actions implemented via controls of an infotainment system, a window status, a seat position, and/or driving style of the vehicle.

In some embodiments, the analysis of braking event and/or sensor data collected by the current or other prior vehicles includes providing the data as an input to a machine learning model. The current vehicle is controlled by performing one or more actions that are based on an output from the machine learning model.

In one example, a machine learning model is trained and/or otherwise used to configure a vehicle (e.g., tailor actions of the vehicle). For example, the machine learning model may be based on pattern matching in which prior patterns of sensor inputs or other data is correlated with desired characteristics or configuration(s) for operation of the vehicle.

In one embodiment, data received from the current vehicle may include sensor data collected by the vehicle during its real world services (e.g., when the user is a driver or a passenger). In one embodiment, the data is transmitted from the vehicles to a centralized server (e.g., of a cloud service), which performs machine learning/training, using a supervised method and the received sensor data and/or other data, to generate an updated ANN model that can be subsequently loaded into the vehicle to replace its previously-installed ANN model. The model is used to configure the operation of the vehicle.

In some embodiments, the driver can take over certain operations from the vehicle in response to the vehicle receiving a communication that an unsafe location has been identified. One or more cameras of the vehicle, for example, can be used to collect image data that assists in implementing this action. In one example, the vehicle is configured in real-time to respond to the received braking event and/or object data.

FIG. 1 illustrates a system to receive data regarding braking events occurring on a plurality of vehicles, according to one embodiment. The system uses an Artificial Neural Network (ANN) model in some embodiments. The system of FIG. 1 includes a centralized server 101 in communication with a set of vehicles 111, . . . , 113 via a communication network 102.

In one embodiment, data regarding braking events occurring on vehicles (e.g., other or prior vehicle 113) is received by server 101 via communication network 102. The received data includes a location for each of the braking events. For example, the received data can include an event location 163 for each braking event 161. Braking event 161 can include data such as, for example, an identifier, a type of braking event, etc. The received braking event data can be stored as part of map data 160.

In some embodiments, additional data is received by server 101 from the vehicles. This can include, for example, data regarding detected objects such as object type 162 and object location 164. This additional data can be stored as part of map data 160. Also, additional data such as sensor data 103 can be received from the vehicles.

The braking event data received from the vehicles by server 101 is analyzed. For example, this analysis can include pattern recognition or other data analysis (e.g., determining a correlation of braking event data to other data) to determine that the braking events correspond to a pattern. For example, event location data 163 can be analyzed to detect a pattern. In one embodiment, this pattern detection can be based at least in part on an output from artificial neural network model 119.

Based on analysis of the received braking event data, a location is identified (e.g., an unsafe road obstacle). For example, server 101 may determine that a set of braking events corresponds to a pattern and a corresponding location is identified based on this determination. In one example, a location can be determined as being unsafe based on numerous emergency braking activations on vehicles at that location or within a predetermined distance of the identified location.

In response to identifying the location, at least one action is performed. For example, server 101 can transmit a communication to current vehicle 111 that causes the vehicle to change a navigation path and/or activate a braking system when within a predetermined distance of the identified unsafe location.

In some embodiments, in addition to sending data regarding braking events, vehicle 113 and/or other prior vehicles send data regarding objects detected during travel (e.g. vehicle 113 can be traveling prior to current vehicle 111, which arrives later at the same location where an object has been detected by vehicle 113). These objects can include, for example, object 155 and object 157. Sensors of vehicle 113 and the other prior vehicles collect and/or generate data regarding the objects that have been detected. Data regarding detected objects can be analyzed in conjunction with braking event data in order to identify a location that prompts an action.

Data regarding the detected objects is sent, via communications network 102, to a computing device such as server 101 (e.g., which may be part of a cloud service). Server 101 receives the object data from vehicle 113 and the other prior vehicles. Server 101 stores a map (e.g., including map data 160), which may include a number of records for each object. In one example, map data 160 includes object type 162 and object location 164 for each object. Map data 160 also may include braking event data 161 and corresponding event locations 163, as mentioned above.

Subsequent to receiving the data regarding detected objects from the prior vehicles, a current vehicle 111 also may transmit data regarding new objects that are being detected during travel. For example, object 155 can be a new object from the perspective of vehicle 111.

Server 101 receives data regarding object 155 from vehicle 111. In some embodiments, server 101 may determine, based on comparing the data regarding object 155 that is received from vehicle 111 to data regarding object 155 that is stored in map data 160, how vehicle 111 should respond to an unsafe location that has been identified.

In some cases, vehicle 111 sends its current location to server 101. The location of vehicle 111 is compared to object location 164 for object 155. Server 101 determines a response that vehicle 111 should perform associated with object 155.

In one embodiment, in response to identifying a location, server 101 performs one or more actions. For example, server 101 can transmit a communication to vehicle 111 that causes a termination of an autonomous driving mode.

In one embodiment, sensor data 103 can be collected in addition to map data 160. Sensor data 103 can be, for example, provided by the current vehicle 111 and/or prior vehicles 113 (e.g., sensor data 103 may be for data other than object data, such as temperature, acceleration, audio, etc.). Sensor data 103 can be used in combination with map data 160 and/or other new data received from current vehicle 111 to perform an analysis of received data (including received braking event data). In some cases, some or all of the foregoing data can be used to train artificial neural network model 119. Additionally, in some cases, an output from artificial neural network model 119 can be used as part of making a determination of an unsafe location.

In some embodiments, at least a portion of map data 160 can be transmitted to vehicle 111 and a determination or control action (e.g., navigation path change) regarding an operating status of vehicle 111 can be locally determined by a computing device mounted on or within vehicle 111. In some embodiments, artificial neural network model 119 itself and/or associated data can be transmitted to and implemented on vehicle 111 and/or other vehicles. An output from artificial neural network model 119 can be used to determine actions performed in response to identifying an unsafe location based on braking event data (e.g., an identification received from server 101 by vehicle 111).

In one embodiment, data from vehicle 111 (or from vehicle 113) can be collected by sensors located in the vehicle. The collected data is analyzed, for example, using a computer model such as an artificial neural network (ANN) model. In one embodiment, the collected data is provided as an input to the ANN model. For example, the ANN model can be executed on server 101 and/or vehicle 111. The vehicle 111 is controlled based on at least one output from the ANN model. For example, this control includes performing one or more actions based on the output. These actions can include, for example, control of steering, braking, acceleration, and/or control of other systems of vehicle 111 such as an infotainment system and/or communication device.

In one embodiment, the server 101 includes a supervised training module 117 to train, generate, and update ANN model 119 that includes neuron biases 121, synaptic weights 123, and activation functions 125 of neurons in a network used for processing braking event data, and/or other collected data regarding a vehicle and/or sensor data generated in the vehicles 111, . . . , 113.

In one embodiment, once the ANN model 119 is trained and implemented (e.g., for autonomous driving and/or an advanced driver assistance system), the ANN model 119 can be deployed on one or more of vehicles 111, . . . , 113 for usage.

In various embodiments, the ANN model is trained using data as discussed above. The training can be performed on a server and/or the vehicle. Configuration for an ANN model as used in a vehicle can be updated based on the training. The training can be performed in some cases while the vehicle is being operated.

Typically, the vehicles 111, . . . , 113 have sensors, such as a visible light camera, an infrared camera, a LIDAR, a RADAR, a sonar, and/or a set of peripheral sensors. The sensors of the vehicles 111, . . . , 113 generate sensor inputs for the ANN model 119 in autonomous driving and/or advanced driver assistance system to generate operating instructions, such as steering, braking, accelerating, driving, alerts, emergency response, etc.

During the operations of the vehicles 111, . . . , 113 in their respective service environments, the vehicles 111, . . . , 113 encounter items, such as events or objects, that are captured in the sensor data. The ANN model 119 is used by the vehicles 111, . . . , 113 to provide the identifications of the items to facilitate the generation of commands for the operations of the vehicles 111, . . . , 113, such as for autonomous driving and/or for advanced driver assistance. Capturing of certain of this data can be triggered in response to determining that a braking event has or is occurring. For example, vehicle 113 may determine that a braking event is occurring and activate collection of predetermined types or extent of sensor data (e.g., image data for detected objects).

In one example, a vehicle may communicate, via a wireless connection 115 to an access point (or base station) 105, with the server 101 to submit the sensor input to enrich the sensor data 103 as an additional dataset for machine learning implemented using the supervised training module 117. The wireless connection 115 may be made via a wireless local area network, a cellular communications network, and/or a communication link 107 to a satellite 109 or a communication balloon. In one example, user data collected from a vehicle can be similarly transmitted to the server.

Optionally, the sensor input stored in the vehicle may be transferred to another computer for uploading to the centralized server 101. For example, the sensor input can be transferred to another computer via a memory device, such as a Universal Serial Bus (USB) drive, and/or via a wired computer connection, a Bluetooth or WiFi connection, a diagnosis tool, etc.

Periodically, the server 101 may run the supervised training module 117 to update the ANN model 119 based on updated data that has been received. The server 101 may use the sensor data 103 enhanced with the other data based on prior operation by similar vehicles (e.g., braking event data received from vehicle 113) that are operated in the same geographical region or in geographical regions having similar traffic conditions (e.g., to generate a customized version of the ANN model 119 for the vehicle 111).

Optionally, the server 101 uses the sensor data 103 along with object data received from a general population of vehicles (e.g., 111, 113) to generate an updated version of the ANN model 119. The updated ANN model 119 can be downloaded to the current vehicle (e.g., vehicle 111) via the communications network 102, the access point (or base station) 105, and communication links 115 and/or 107 as an over-the-air update of the firmware/software of the vehicle.

Optionally, the vehicle 111 has a self-learning capability. After an extended period on the road, the vehicle 111 may generate a new set of synaptic weights 123, neuron biases 121, activation functions 125, and/or neuron connectivity for the ANN model 119 installed in the vehicle 111 using the sensor inputs it collected and stored in the vehicle 111. As an example, the centralized server 101 may be operated by a factory, a producer or maker of the vehicles 111, . . . , 113, or a vendor of the autonomous driving and/or advanced driver assistance system for vehicles 111, . . . , 113.

Figure 2:
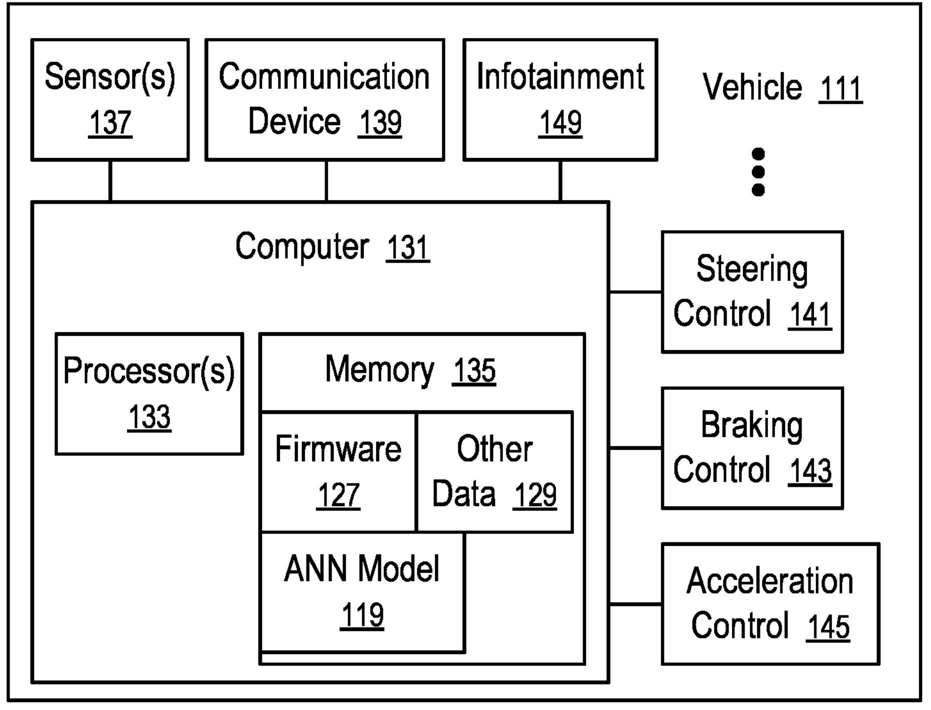
FIG. 2 shows an example of a vehicle configured using an Artificial Neural Network (ANN) model, according to one embodiment.

FIG. 2 shows an example of a vehicle configured using an Artificial Neural Network (ANN) model, according to one embodiment. The vehicle 111 of FIG. 2 includes an infotainment system 149, a communication device 139, one or more sensors 137, and a computer 131 that is connected to some controls of the vehicle 111, such as a steering control 141 for the direction of the vehicle 111, a braking control 143 for stopping of the vehicle 111, an acceleration control 145 for the speed of the vehicle 111, etc. In some embodiments, vehicle 113 of FIG. 1 has a similar configuration and/or similar components.

The computer 131 of the vehicle 111 includes one or more processors 133, memory 135 storing firmware (or software) 127, the ANN model 119 (e.g., as illustrated in FIG. 1), and other data 129.

In one example, firmware 127 is updated by an over-the-air update in response to a communication from server 101 sent in response to identifying an unsafe location (e.g., located on a road that vehicle 111 is travelling on). Alternatively, and/or additionally, other firmware of various computing devices or systems of vehicle 111 can be updated.

The one or more sensors 137 may include a visible light camera, an infrared camera, a LIDAR, RADAR, or sonar system, and/or peripheral sensors, which are configured to provide sensor input to the computer 131. A module of the firmware (or software) 127 executed in the processor(s) 133 applies the sensor input to an ANN defined by the model 119 to generate an output that identifies or classifies an event or object captured in the sensor input, such as an image or video clip. Data from this identification and/or classification can be included in object data sent from a vehicle to server 101 as discussed above.

Alternatively, and/or additionally, the identification of an unsafe location and/or classification of a braking event or object generated by the ANN model 119 can be used by an autonomous driving module of the firmware (or software) 127, or an advanced driver assistance system, to generate a response. The response may be a command to activate and/or adjust one of the vehicle controls 141, 143, and 145. In one embodiment, the response is an action performed by the vehicle where the action has been configured based on an update command from server 101 (e.g., the update command can be generated by server 101 in response to determining that vehicle 111 is approaching a location identified based on analysis of braking event data). In one embodiment, prior to generating the control response, the vehicle is configured. In one embodiment, the configuration of the vehicle is performed by updating firmware of vehicle 111. In one embodiment, the configuration of the vehicle includes updating of the computer model stored in vehicle 111 (e.g., ANN model 119).

The server 101 stores the received sensor input as part of the sensor data 103 for the subsequent further training or updating of the ANN model 119 using the supervised training module 117. When an updated version of the ANN model 119 is available in the server 101, the vehicle 111 may use the communication device 139 to download the updated ANN model 119 for installation in the memory 135 and/or for the replacement of the previously installed ANN model 119. These actions may be performed in response to determining that vehicle 111 is failing to properly detect objects and/or in response to identifying an unsafe location.

In one example, the outputs of the ANN model 119 can be used to control (e.g., 141, 143, 145) the acceleration of a vehicle (e.g., 111), the speed of the vehicle 111, and/or the direction of the vehicle 111, during autonomous driving or provision of advanced driver assistance.

Typically, when the ANN model is generated, at least a portion of the synaptic weights 123 of some of the neurons in the network is updated. The update may also adjust some neuron biases 121 and/or change the activation functions 125 of some neurons. In some instances, additional neurons may be added in the network. In other instances, some neurons may be removed from the network.

In one example, data obtained from a sensor of a vehicle may be an image that captures an object using a camera that images using lights visible to human eyes, or a camera that images using infrared lights, or a sonar, radar, or LIDAR system. In one embodiment, image data obtained from at least one sensor of the vehicle is part of the collected data from the vehicle that is analyzed. In some instances, the ANN model is configured for a particular vehicle based on the sensor and other collected data.

Figure 3:
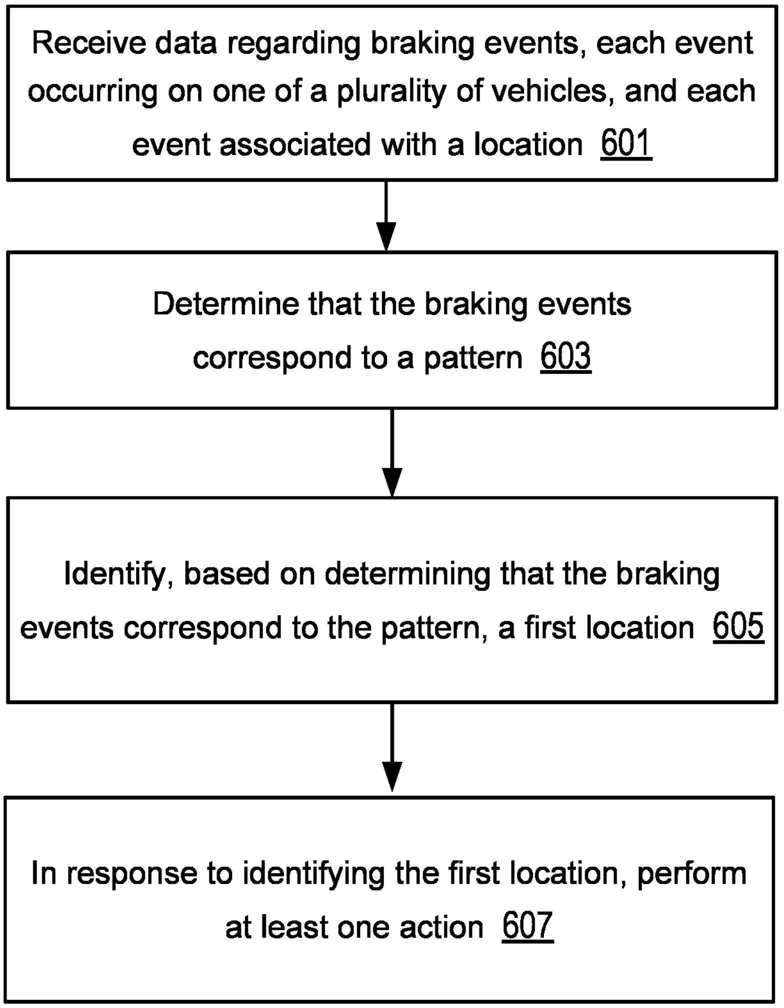
FIG. 3 shows a method to identify a location based on determining that braking events correspond to a pattern, according to one embodiment.

FIG. 3 shows a method to identify a location based on determining that braking events correspond to a pattern, according to one embodiment. In block 601, data is received regarding braking events for vehicles (e.g., vehicle 113 and/or other vehicles). Each braking event occurs on one of the vehicles, and each event is associated with a location at which the braking event occurs.

In block 603, a determination is made that the braking events correspond to a pattern. The pattern may be, for example, that a predetermined number of the braking events occur within a predetermined distance of one another.

In block 605, a first location is identified based on determining that the braking events correspond to the pattern. For example, a number of braking events occurring within a predetermined distance can be associated with a location at which the events occurred. In some embodiments, this location can be specified as a defined area, a zone, a physical region or territory, etc.

In block 607, in response to identifying the first location (e.g., identifying that the first location is unsafe based on various parameters), at least one action is performed. For example, the action can be performed by server 101 (e.g., sending of a communication to current vehicle 111 to cause a control action on the vehicle). In another example, the action can include sending at least one communication to a computing device other than the new vehicle. In one example, the computing device is a server that monitors an operating status for each of one or more vehicles.

In one embodiment, a system includes: at least one processor; and memory storing instructions configured to instruct the at least one processor to: receive data regarding braking events, each event occurring on one of a plurality of vehicles, and each event associated with a location; determine that the braking events correspond to a pattern; identify, based on determining that the braking events correspond to the pattern, a first location; and in response to identifying the first location, perform at least one action.

In one embodiment, determining that the braking events correspond to the pattern comprises comparing a deceleration of the respective vehicle for each of the braking events to a predetermined threshold.

In one embodiment, determining that the braking events correspond to the pattern comprises at least one of: determining that the respective location for each of the braking events is within a predetermined distance of the first location; or determining that a distance between the respective locations for the braking events is within a predetermined value.

In one embodiment, each of the braking events corresponds to activation of at least one of an automatic emergency braking system or an anti-lock braking system of the respective vehicle.

In one embodiment, determining that the braking events correspond to the pattern comprises comparing a measurement associated with activation of a braking system of the respective vehicle to a predetermined threshold.

In one embodiment, the measurement is associated with movement of a brake pedal by a user of the respective vehicle.

In one embodiment, the predetermined threshold is a level of pressure or an extent of motion associated with depressing of the brake pedal.

In one embodiment, determining that the braking events correspond to the pattern comprises comparing a number of the braking events that occur within a predetermined time period to a threshold.

In one embodiment, determining that the braking events correspond to the pattern comprises identifying the pattern based at least in part on an output from a machine learning model.

In one embodiment, the machine learning model is an artificial neural network.

In one embodiment, performing the at least one action comprises sending a communication to a first vehicle, the communication causing the first vehicle to perform at least one of controlling an operation of the first vehicle based on an output from an artificial neural network, deactivating an autonomous driving mode of the first vehicle, or controlling a navigation system of the first vehicle.

In one embodiment, the instructions are further configured to instruct the at least one processor to store a map including the respective locations for each of the braking events.

In one embodiment, the instructions are further configured to instruct the at least one processor to provide, based on the map, a navigation service to a first vehicle.

In one embodiment, the data regarding braking events is received by a server that monitors a respective operating status for each of the plurality of vehicles, and monitoring the operating status includes receiving data regarding objects detected by each of the vehicles.

In one embodiment, performing the at least one action is based on an output from a machine learning model, and the machine learning model is trained using training data, the training data comprising data collected by sensors of the plurality of vehicles.

Figure 4:
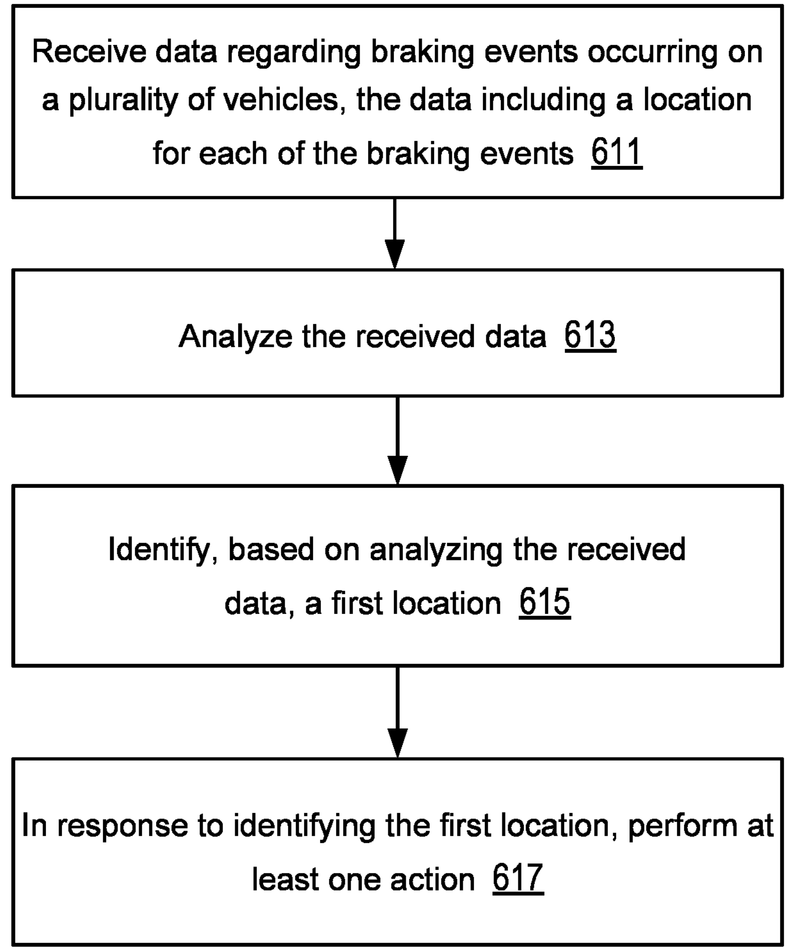
FIG. 4 shows a method to identify a location based on analysis of data regarding braking events for a plurality of vehicles, according to one embodiment.

FIG. 4 shows a method to identify a location based on analysis of data regarding braking events for a plurality of vehicles (e.g., vehicle 113 and/or other vehicles), according to one embodiment. In block 611, data is received regarding braking events occurring on the vehicles. The data includes a location for each braking event.

In block 613, the received data is analyzed. For example, braking event data 161 and event location data 163 can be analyzed to determine that the data corresponds to a pattern and/or other correlation.

In block 615, based on analyzing the received data, a first location is identified. For example, the location can be identified by geographic coordinates and a type of condition associated with the result of the analysis. This type of condition can, for example, be communicated to a vehicle for use in determining a control action.

In block 617, in response to identifying the first location, one or more actions are performed. These actions can be performed by, for example, server 101, server 301, or server 701.

In one embodiment, a method includes: receiving, by at least one processor, data regarding braking events occurring on a plurality of vehicles, the data including a location for each of the braking events; analyzing, by the at least one processor, the received data; identifying, based on analyzing the received data, a first location; and in response to identifying the first location, performing at least one action.

In one embodiment, performing the at least one action comprises configuring, based on analyzing the received data, a first vehicle, wherein the first vehicle is an autonomous vehicle comprising a controller and a storage device, wherein configuring the first vehicle comprises updating firmware of the controller, and wherein the updated firmware is stored in the storage device.

In one embodiment, the method further comprises, in response to identifying the first location, analyzing image data associated with the first location, wherein analyzing the image data comprises performing pattern recognition on image data to determine at least one object associated with the first location.

In one embodiment, analyzing the received data comprises determining that the respective locations for the braking events are within a predetermined area.

In one embodiment, a non-transitory computer storage medium stores instructions which, when executed on a computing device, cause the computing device to perform a method comprising: receiving, by at least one processor, data regarding braking events occurring on a plurality of vehicles, the data including a location for each of the braking events; analyzing, by the at least one processor, the received data; and in response to analyzing the received data, performing at least one action.

Figure 5:
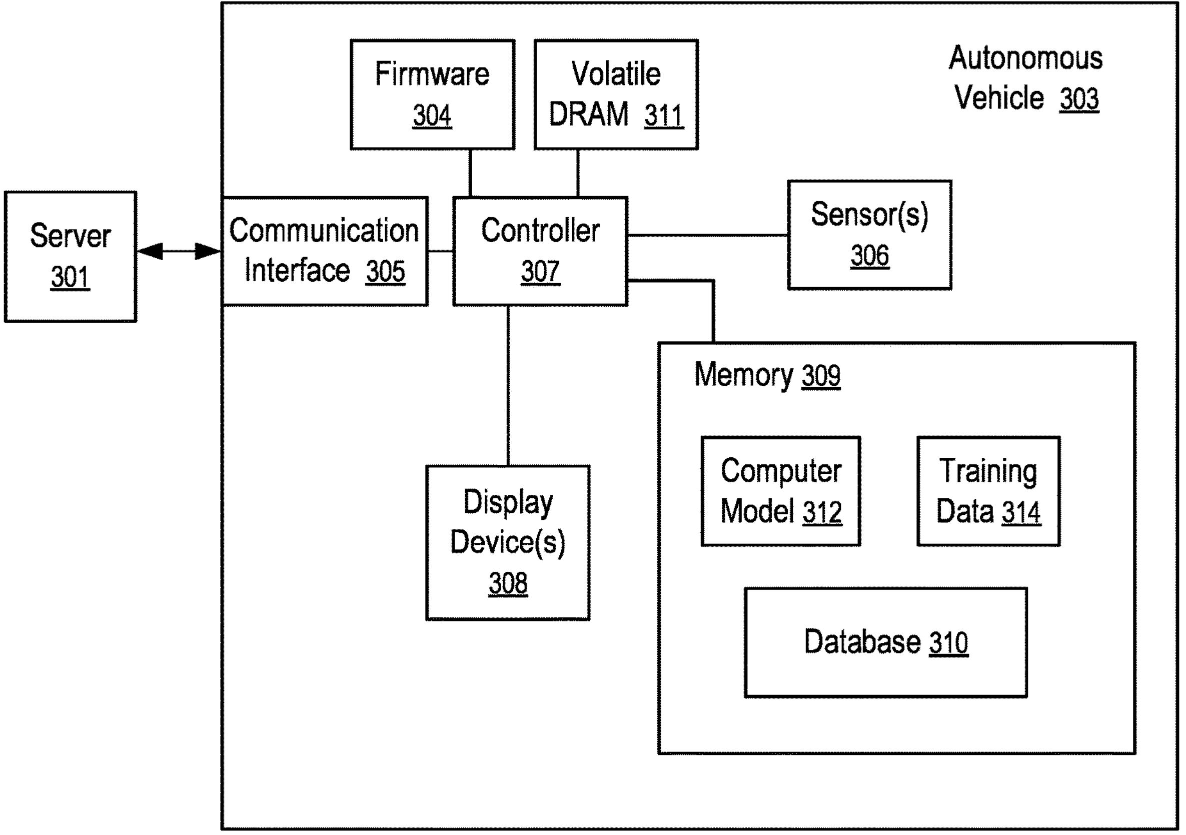
FIG. 5 shows an autonomous vehicle controlled and/or configured in response to determining identifying a location associated with braking events, according to one embodiment.

FIG. 5 shows an autonomous vehicle 303 controlled and/or configured in response to identifying a location associated with braking events, according to one embodiment. A system controls a display device 308 or other device, system, or component of an autonomous vehicle 303. For example, a controller 307 controls the display of images on one or more display devices 308. Controller 307 also controls navigation of the vehicle (e.g. using braking control 143 of FIG. 2).

Server 301 may store, for example, map data 160. Server 301 may determine, using map data 160, that vehicle 303 is approaching an unsafe location (and/or is failing to properly detect objects). In response to this determination, server 301 may cause the controller 307 to terminate an autonomous navigation mode. Other actions can be performed in response to this determination including, for example, configuring a vehicle 303 by updating firmware 304, updating computer model 312, updating data in database 310, and/or updating training data 314.

The controller 307 may receive data collected by one or more sensors 306. The sensors 306 may be, for example, mounted in the autonomous vehicle 303. The sensors 306 may include, for example, a camera, a microphone, a motion detector, and/or a camera. At least a portion of the sensors may provide data associated with objects newly detected by vehicle 303 during travel.

The sensors 306 may provide various types of data for collection by the controller 307. For example, the collected data may include image data from the camera and/or audio data from the microphone.

In one embodiment, the controller 307 analyzes the collected data from the sensors 306. The analysis of the collected data includes providing some or all of the collected data as one or more inputs to a computer model 312. The computer model 312 can be, for example, an artificial neural network trained by deep learning. In one example, the computer model is a machine learning model that is trained using training data 314. The computer model 312 and/or the training data 314 can be stored, for example, in memory 309. An output from the computer model 312 can be transmitted to server 301 as part of object data for comparison to map data 160.

In one embodiment, memory 309 stores a database 310, which may include data collected by sensors 306 and/or data received by a communication interface 305 from computing device, such as, for example, a server 301 (server 301 can be, for example, server 101 of FIG. 1 in some embodiments). In one example, this communication may be used to wirelessly transmit collected data from the sensors 306 to the server 301. The received data may include configuration, training, and other data used to configure control of the display devices 308 or other components by controller 307.

In one example, the received data may include data collected from sensors of autonomous vehicles other than autonomous vehicle 303. This data may be included, for example, in training data 314 for training of the computer model 312. The received data may also be used to update a configuration of a machine learning model stored in memory 309 as computer model 312.

In FIG. 5, firmware 304 controls, for example, the operations of the controller 307 in controlling the display devices 308 and other components of vehicle 303. The controller 307 also can, for example, run the firmware 304 to perform operations responsive to communications from the server 301. The autonomous vehicle 303 includes volatile Dynamic Random-Access Memory (DRAM) 311 for the storage of run-time data and instructions used by the controller 307.

In one embodiment, memory 309 is implemented using various memory/storage technologies, such as NAND gate based flash memory, phase-change memory (PCM), magnetic memory (MRAM), resistive random-access memory, and 3D XPoint, such that the memory 309 is non-volatile and can retain data stored therein without power for days, months, and/or years.

In one embodiment server 301 communicates with the communication interface 305 via a communication channel. In one embodiment, the server 301 can be a computer having one or more Central Processing Units (CPUs) to which vehicles, such as the autonomous vehicle 303, may be connected using a computer network. For example, in some implementations, the communication channel between the server 301 and the communication interface 305 includes a computer network, such as a local area network, a wireless local area network, a cellular communications network, or a broadband high-speed always-connected wireless communication connection (e.g., a current or future generation of mobile network link).

In one embodiment, the controller 307 performs data intensive, in-memory processing using data and/or instructions organized in memory 309 or otherwise organized in the autonomous vehicle 303. For example, the controller 307 can perform a real-time analysis of a set of data collected and/or stored in the autonomous vehicle 303. In some embodiments, the set of data further includes collected or configuration update data obtained from server 301.

At least some embodiments of the systems and methods disclosed herein can be implemented using computer instructions executed by the controller 307, such as the firmware 304. In some instances, hardware circuits can be used to implement at least some of the functions of the firmware 304. The firmware 304 can be initially stored in non-volatile storage media, such as by using memory 309, or another non-volatile device, and loaded into the volatile DRAM 311 and/or the in-processor cache memory for execution by the controller 307. In one example, the firmware 104 can be configured to use the techniques discussed herein for controlling display or other devices of a vehicle as configured based on collected user data.

Figure 6:
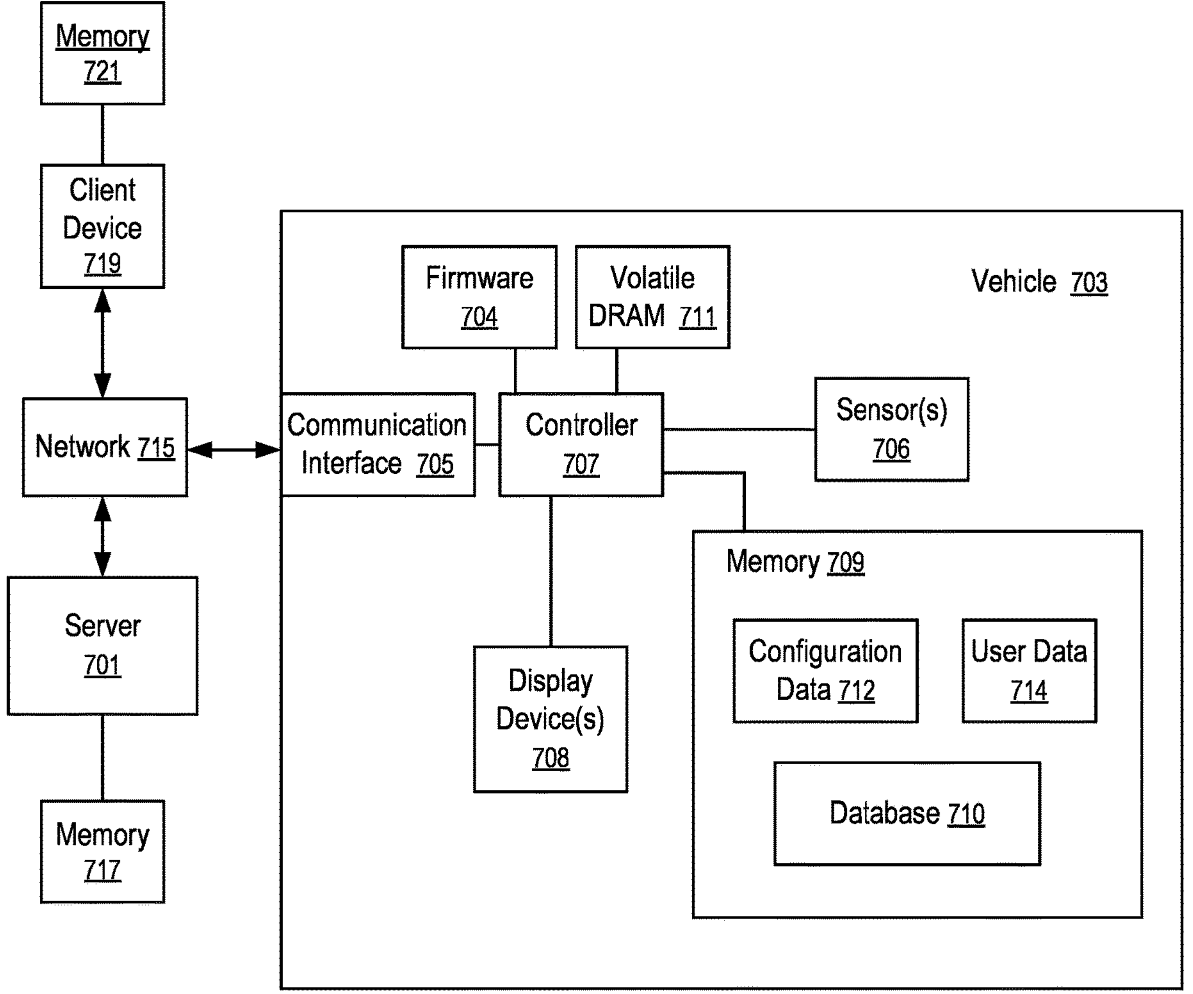
FIG. 6 shows a vehicle controlled and/or configured via a communication interface using a cloud service, according to one embodiment.

FIG. 6 shows a vehicle 703 controlled and/or configured via a communication interface using a cloud service, according to one embodiment. For example, vehicle 703 receives a control communication and/or is configured in response to a determination by server 701 that vehicle 703 is approaching an unsafe location identified, at least in part, based on braking event data received from other vehicles.

The vehicle 703 includes a communication interface 705 used to receive a configuration update, which is based on analysis of collected object data. For example, the update can be received from server 701 and/or client device 719. Communication amongst two or more of the vehicle 703, a server 701, and a client device 719 can be performed over a network 715 (e.g., a wireless network). This communication is performed using communication interface 705.

In one embodiment, the server 701 controls the loading of configuration data (e.g., based on analysis of collected data) of the new configuration into the memory 709 of the vehicle. In one embodiment, data associated with usage of vehicle 703 is stored in a memory 721 of client device 719.

A controller 707 controls one or more operations of the vehicle 703. For example, controller 707 controls user data 714 stored in memory 709. Controller 707 also controls loading of updated configuration data into memory 709 and/or other memory of the vehicle 703. Controller 707 also controls display of information on display device(s) 708. Sensor(s) 706 provide data regarding operation of the vehicle 703. At least a portion of this operational data can be communicated to the server 701 and/or the client device 719.

Memory 709 can further include, for example, configuration data 712 and/or database 710. Configuration data 712 can be, for example, data associated with operation of the vehicle 703 as provided by the server 701. The configuration data 712 can be, for example, based on collected and/or analyzed object data (including braking event data received by server 701 from vehicles).

Database 710 can store, for example, configuration data for a user and/or data collected by sensors 706. Database 710 also can store, for example, navigational maps and/or other data provided by the server 701.

In one embodiment, when a vehicle is being operated, data regarding object detection activity of vehicle 703 can be communicated to server 701. This activity may include navigational and/or other operational aspects of the vehicle 703.

As illustrated in FIG. 6, controller 707 also may control the display of images on one or more display devices 708 (e.g., an alert to the user can be displayed in response to determining by server 701 and/or controller 707 that vehicle 703 is failing to properly detect objects). Display device 708 can be a liquid crystal display. The controller 707 may receive data collected by one or more sensors 706. The sensors 706 may be, for example, mounted in the vehicle 703. The sensors 706 may include, for example, a camera, a microphone, a motion detector, and/or a camera.

The sensors 706 may provide various types of data for collection and/or analysis by the controller 707. For example, the collected data may include image data from the camera and/or audio data from the microphone. In one embodiment, the image data includes images of one or more new objects encountered by vehicle 703 during travel.

In one embodiment, the controller 707 analyzes the collected data from the sensors 706. The analysis of the collected data includes providing some or all of the object data to server 701.

In one embodiment, memory 709 stores database 710, which may include data collected by sensors 706 and/or configuration data received by communication interface 705 from a computing device, such as, for example, server 701. For example, this communication may be used to wirelessly transmit collected data from the sensors 706 to the server 701. The data received by the vehicle may include configuration or other data used to configure control of navigation, display, or other devices by controller 707.

In FIG. 6, firmware 704 controls, for example, the operations of the controller 707. The controller 707 also can, for example, run the firmware 704 to perform operations responsive to communications from the server 701.

The vehicle 703 includes volatile Dynamic Random-Access Memory (DRAM) 711 for the storage of run-time data and instructions used by the controller 707 to improve the computation performance of the controller 707 and/or provide buffers for data transferred between the server 701 and memory 709. DRAM 711 is volatile.

Figure 7:
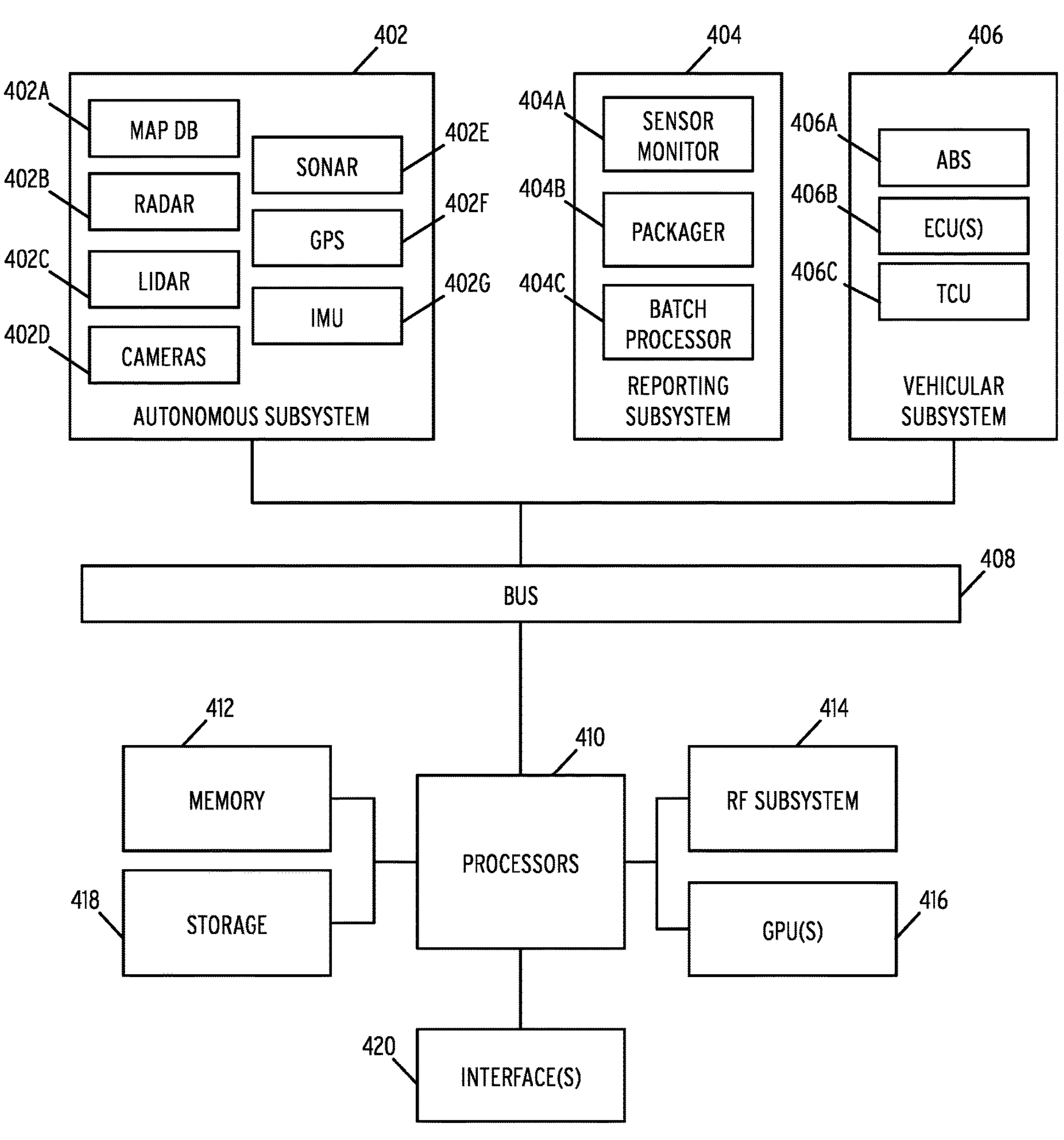
FIG. 7 is a block diagram of an autonomous vehicle including one or more various components and/or subsystems, each of which can be updated in various embodiments to configure the vehicle and/or perform other actions associated with the vehicle.

FIG. 7 is a block diagram of an autonomous vehicle including one or more various components and/or subsystems, each of which can be updated in various embodiments to configure the vehicle and/or perform other actions associated with the vehicle (e.g., configuration and/or other actions performed in response to identifying a location based on analyzing braking events of a plurality of vehicles). The system illustrated in FIG. 7 may be installed entirely within a vehicle.

The system includes an autonomous vehicle subsystem 402. In the illustrated embodiment, autonomous vehicle subsystem 402 includes map database 402A, radar devices 402B, Lidar devices 402C, digital cameras 402D, sonar devices 402E, GPS receivers 402F, and inertial measurement units 402G. Each of the components of autonomous vehicle subsystem 402 comprise standard components provided in most current autonomous vehicles. In one embodiment, map database 402A stores a plurality of high-definition three-dimensional maps used for routing and navigation. Radar devices 402B, Lidar devices 402C, digital cameras 402D, sonar devices 402E, GPS receivers 402F, and inertial measurement units 402G may comprise various respective devices installed at various positions throughout the autonomous vehicle as known in the art. For example, these devices may be installed along the perimeter of an autonomous vehicle to provide location awareness, collision avoidance, and other standard autonomous vehicle functionality.

Vehicular subsystem 406 is additionally included within the system. Vehicular subsystem 406 includes various anti-lock braking systems 406A, engine control units 402B, and transmission control units 402C. These components may be utilized to control the operation of the autonomous vehicle in response to the streaming data generated by autonomous vehicle subsystem 402A. The standard autonomous vehicle interactions between autonomous vehicle subsystem 402 and vehicular subsystem 406 are generally known in the art and are not described in detail herein.

The processing side of the system includes one or more processors 410, short-term memory 412, an RF system 414, graphics processing units (GPUs) 416, long-term storage 418 and one or more interfaces 420.

The one or more processors 410 may comprise central processing units, FPGAs, or any range of processing devices needed to support the operations of the autonomous vehicle. Memory 412 comprises DRAM or other suitable volatile RAM for temporary storage of data required by processors 410. RF system 414 may comprise a cellular transceiver and/or satellite transceiver. Long-term storage 418 may comprise one or more high-capacity solid-state drives (SSDs). In general, long-term storage 418 may be utilized to store, for example, high-definition maps, routing data, and any other data requiring permanent or semi-permanent storage. GPUs 416 may comprise one more high throughput GPU devices for processing data received from autonomous vehicle subsystem 402A. Finally, interfaces 420 may comprise various display units positioned within the autonomous vehicle (e.g., an in-dash screen).

The system additionally includes a reporting subsystem 404 which performs data collection (e.g., collection of data obtained from sensors of the vehicle that is used to drive the vehicle). The reporting subsystem 404 includes a sensor monitor 404A which is connected to bus 408 and records sensor data transmitted on the bus 408 as well as any log data transmitted on the bus. The reporting subsystem 404 may additionally include one or more endpoints to allow for system components to transmit log data directly to the reporting subsystem 404.

The reporting subsystem 404 additionally includes a packager 404B. In one embodiment, packager 404B retrieves the data from the sensor monitor 404A or endpoints and packages the raw data for transmission to a central system (illustrated in FIG. 8). In some embodiments, packager 404B may be configured to package data at periodic time intervals. Alternatively, or in conjunction with the foregoing, packager 404B may transmit data in real-time and may compress data to facilitate real-time communications with a central system.

The reporting subsystem 404 additionally includes a batch processor 404C. In one embodiment, the batch processor 404C is configured to perform any preprocessing on recorded data prior to transmittal. For example, batch processor 404C may perform compression operations on the data prior to packaging by packager 404B. In another embodiment, batch processor 404C may be configured to filter the recorded data to remove extraneous data prior to packaging or transmittal. In another embodiment, batch processor 404C may be configured to perform data cleaning on the recorded data to conform the raw data to a format suitable for further processing by the central system.

Each of the devices is connected via a bus 408. In one embodiment, the bus 408 may comprise a controller area network (CAN) bus. In some embodiments, other bus types may be used (e.g., a FlexRay or MOST bus). Additionally, each subsystem may include one or more additional busses to handle internal subsystem communications (e.g., LIN busses for lower bandwidth communications).

Figure 8:
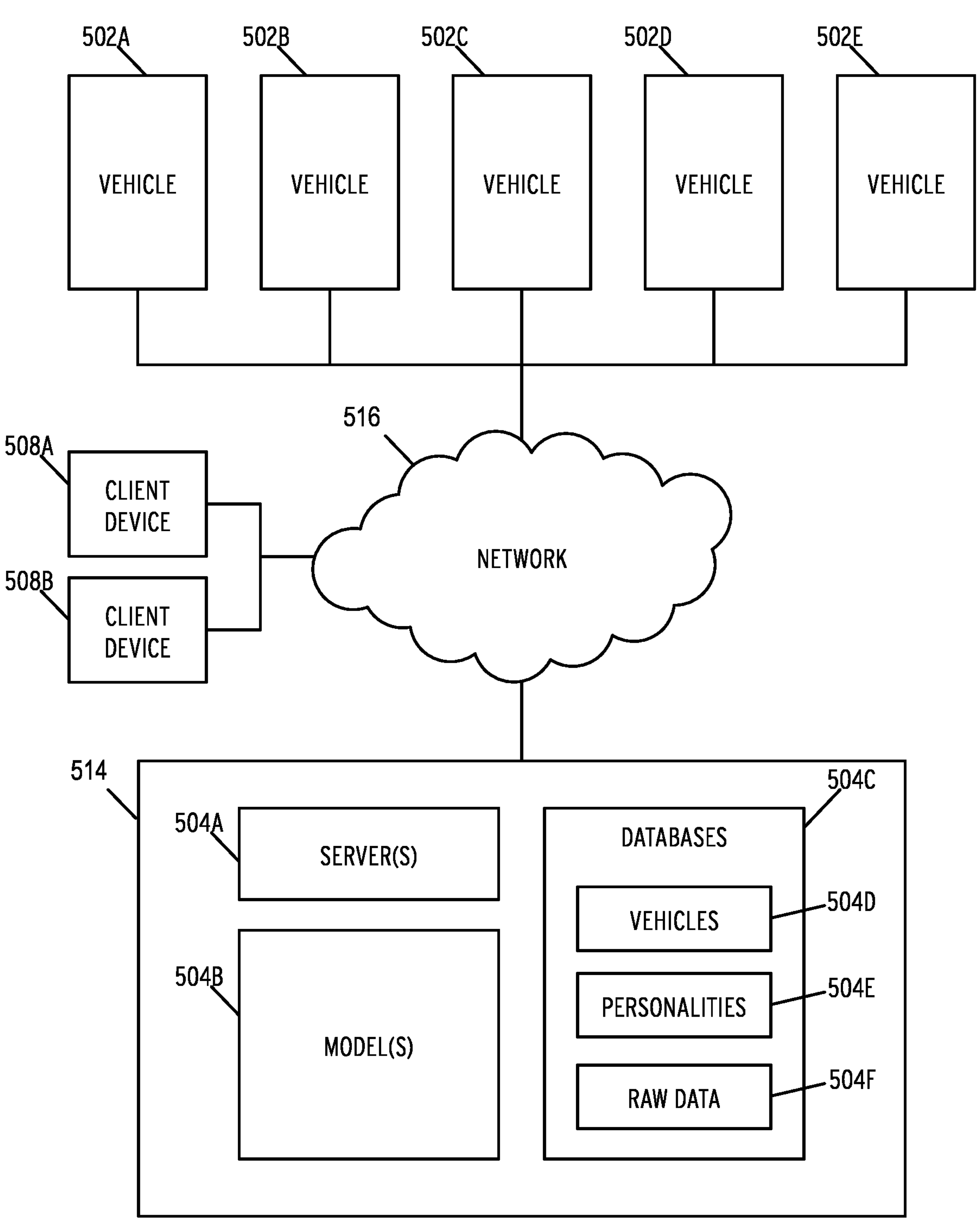
FIG. 8 is a block diagram of a centralized autonomous vehicle operations system, according to various embodiments.

FIG. 8 is a block diagram of a centralized autonomous vehicle operations system, according to various embodiments. As illustrated, the system includes a number of autonomous vehicles 502A-502E. In one embodiment, each autonomous vehicle may comprise an autonomous vehicle such as that depicted in FIG. 7. Each autonomous vehicle 502A-502E may communicate with a central system 514 via a network 516. In one embodiment, network 516 comprises a global network such as the Internet.

In one example, central system 514 is implemented using one or more of servers 101, 301, and/or 701. In one example, one or more of autonomous vehicles 502A-502E are autonomous vehicle 703.

The system additionally includes a plurality of client devices 508A, 508B. In the illustrated embodiment, client devices 508A, 508B may comprise any personal computing device (e.g., a laptop, tablet, mobile phone, etc.). Client devices 508A, 508B may issue requests for data from central system 514. In one embodiment, client devices 508A, 508B transmit requests for data to support mobile applications or web page data, as described previously.

In one embodiment, central system 514 includes a plurality of servers 504A. In one embodiment, servers 504A comprise a plurality of front end webservers configured to serve responses to client device 508A, 508B. The servers 504A may additionally include one or more application servers configured to perform various operations to support one or more vehicles.

In one embodiment, central system 514 additionally includes a plurality of models 504B. In one embodiment, models 504B may store one or more neural networks for classifying autonomous vehicle objects. The models 504B may additionally include models for predicting future events. In some embodiments the models 504B may store a combination of neural networks and other machine learning models.

Central system 514 additionally includes one or more databases 504C. The databases 504C may include database record for vehicles 504D, personalities 504E, and raw data 504F. Raw data 504F may comprise an unstructured database for storing raw data received from sensors and logs as discussed previously.

The present disclosure includes methods and apparatuses which perform the methods described above, including data processing systems which perform these methods, and computer readable media containing instructions which when executed on data processing systems cause the systems to perform these methods.

Each of the server 101 and the computer 131 of a vehicle 111, . . . , or 113 can be implemented as one or more data processing systems. A typical data processing system may include includes an inter-connect (e.g., bus and system core logic), which interconnects a microprocessor(s) and memory. The microprocessor is typically coupled to cache memory.

The inter-connect interconnects the microprocessor(s) and the memory together and also interconnects them to input/output (I/O) device(s) via I/O controller(s). I/O devices may include a display device and/or peripheral devices, such as mice, keyboards, modems, network interfaces, printers, scanners, video cameras and other devices known in the art. In one embodiment, when the data processing system is a server system, some of the I/O devices, such as printers, scanners, mice, and/or keyboards, are optional.

The inter-connect can include one or more buses connected to one another through various bridges, controllers and/or adapters. In one embodiment the I/O controllers include a USB (Universal Serial Bus) adapter for controlling USB peripherals, and/or an IEEE-1394 bus adapter for controlling IEEE-1394 peripherals.

The memory may include one or more of: ROM (Read Only Memory), volatile RAM (Random Access Memory), and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In the present disclosure, some functions and operations are described as being performed by or caused by software code to simplify description. However, such expressions are also used to specify that the functions result from execution of the code/instructions by a processor, such as a microprocessor.

Alternatively, or in combination, the functions and operations as described here can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While one embodiment can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system or a specific application, component, program, object, module or sequence of instructions referred to as "computer programs." The computer programs typically include one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to non-transitory, recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROM), Digital Versatile Disks (DVDs), etc.), among others. The computer-readable media may store the instructions.

The instructions may also be embodied in digital and analog communication links for electrical, optical, acoustical or other forms of propagated signals, such as carrier waves, infrared signals, digital signals, etc. However, propagated signals, such as carrier waves, infrared signals, digital signals, etc. are not tangible machine readable medium and are not configured to store instructions.

In general, a machine readable medium includes any mechanism that provides (i.e., stores and/or transmits) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

The above description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. An apparatus comprising:
at least one processor; and
memory storing instructions configured to instruct the at least one processor to:
determine, using map data compiled from a plurality of vehicles, that an artificial neural network (ANN) of a vehicle is failing to properly operate; and
in response to determining that the ANN is failing to properly operate, cause a change to the vehicle.

2. The apparatus of claim 1, wherein determining that the ANN is failing to properly operate comprises determining that the ANN is failing to identify at least one object.

3. The apparatus of claim 1, wherein the instructions are further configured to instruct the at least one processor to:
receive first data from the vehicle; and
receive second data from other vehicles;
wherein determining that the ANN is failing to properly operate comprises comparing the first data and second data.

4. The apparatus of claim 3, wherein the instructions are further configured to instruct the at least one processor to train the ANN using at least one of the first data or the second data.

5. The apparatus of claim 3, wherein the second data comprises a plurality of objects and corresponding locations.

6. The apparatus of claim 1, wherein the change to the vehicle is at least one of updating data used by the ANN, or training the ANN using new data.

7. The apparatus of claim 1, wherein the ANN provides an output from analyzing image data collected by the vehicle, and determining that the ANN is failing to properly operate comprises comparing the output to a map of object locations.

8. The apparatus of claim 7, wherein the instructions are further configured to instruct the at least one processor to use the map to provide a navigation service to the vehicle.

9. An apparatus comprising:
at least one processor; and
memory storing instructions configured to instruct the at least one processor to:
receive first data from a vehicle;
evaluate the first data in association with map data compiled from a plurality of vehicles;
generate, in response to the evaluation, an updated artificial neural network (ANN); and
load the updated ANN into the vehicle.

10. The apparatus of claim 9, wherein the first data is received by a server, the first data is an identification of an object, and evaluating the first data comprises determining whether the identification corresponds to object data stored by the server.

11. The apparatus of claim 9, wherein the first data is sensor data collected by at least one sensor of the vehicle.

12. The apparatus of claim 9, wherein the updated ANN is configured to provide an output used to control steering or braking of the vehicle.

13. The apparatus of claim 12, wherein at least one input to the updated ANN comprises data collected by at least one sensor of the vehicle.

14. An apparatus comprising:
at least one processor; and
memory storing instructions configured to instruct the at least one processor to:
receive first data from sensors of a plurality of vehicles;
store map data that is based at least in part on the first data;
evaluate, using the first map data, an artificial neural network (ANN) of a vehicle; and
in response to the evaluation, cause an action by the vehicle.

15. The apparatus of claim 14, wherein the instructions are further configured to instruct the at least one processor to store a map based on the first data.

16. The apparatus of claim 15, wherein the evaluation comprises comparing an output of the ANN to the map.

17. The apparatus of claim 14, wherein the action is updating of firmware of the vehicle.

18. The apparatus of claim 14, wherein the action is terminating an autonomous navigation mode of the vehicle.

19. The apparatus of claim 14, wherein the ANN is a first ANN, and evaluating the first ANN is based on an output from a second ANN of a server that uses the first data as input.

20. The apparatus of claim 14, wherein the instructions are further configured to instruct the at least one processor to send the first data to the vehicle, and cause the vehicle to train the ANN using the first data.

* * * * *